No. 870,377. PATENTED NOV. 5, 1907.
P. W. MARETT.
VALVE.
APPLICATION FILED MAR. 4, 1907.

Witnesses
Inventor
Philip W. Marett,
by Shepherd & Parker
Attorney

UNITED STATES PATENT OFFICE.

PHILIP W. MARETT, OF PHILADELPHIA, PENNSYLVANIA.

VALVE.

No. 870,377.   Specification of Letters Patent.   Patented Nov. 5, 1907.

Application filed March 4, 1907. Serial No. 360,527.

*To all whom it may concern:*

Be it known that I, PHILIP W. MARETT, a citizen of the United States, residing at Philadelphia, in the county of Philadelphia and State of Pennsylvania, have invented certain new and useful Improvements in Valves, of which the following is a specification.

My invention relates to valves and more particularly to a compound valve for use in connection with faucets, shower apparatus and the like, and the object in view is to provide a simple and cheap construction and one which will be as nearly frictionless as is possible in order to outlive other structures of this character.

My invention consists broadly in providing a suitable casing having separate hot and cold water inlet connections and a single universal outlet, in combination with novel and substantially frictionless means, manually operable, for closing or opening either the hot or cold water or both as desired.

Figure 1:
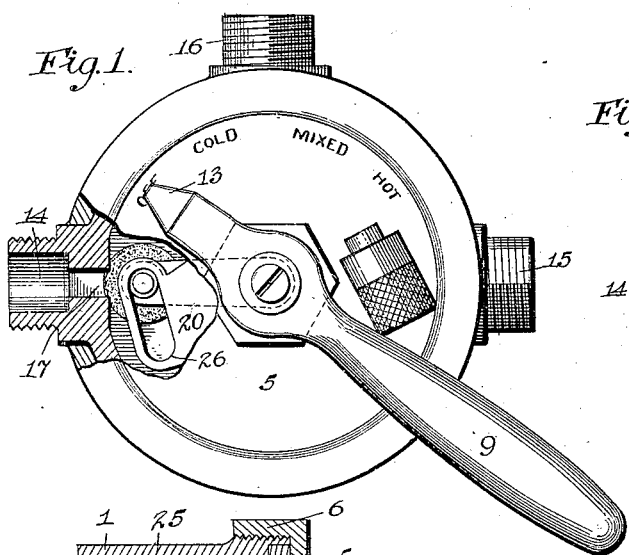
Figure 3:
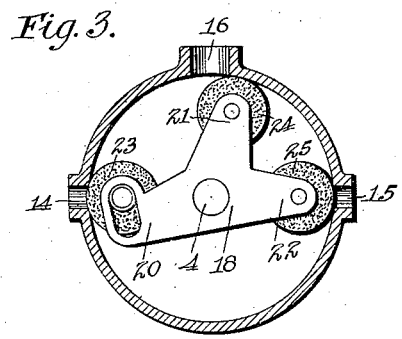
Figure 2:
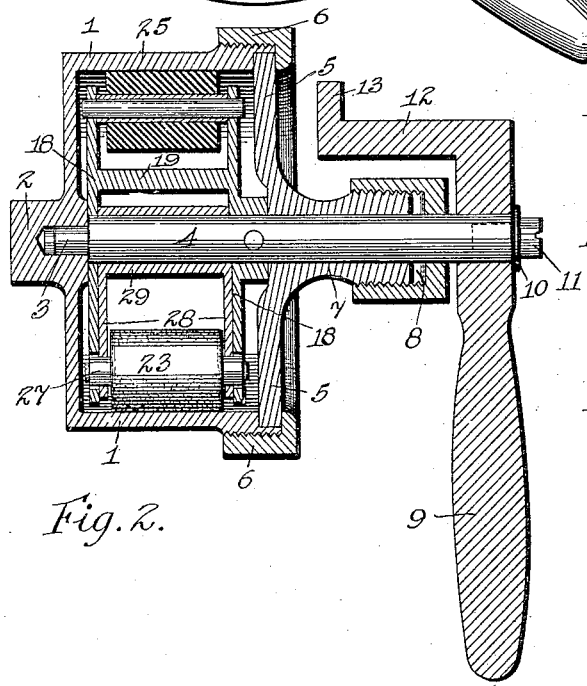
Figure 4:
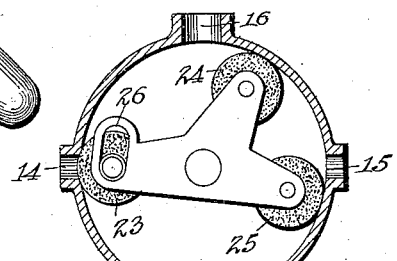
Figure 5:
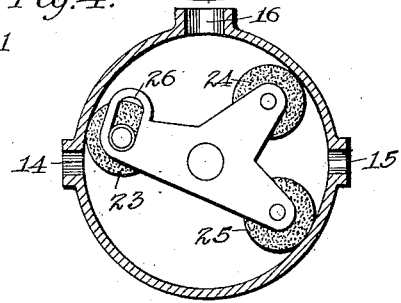
Figure 6:
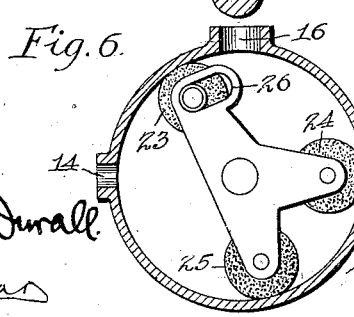

My invention further consists in the following features of construction and arrangement hereinafter described and pointed out in the accompanying drawings, in which, Figure 1 is a front elevation of my valve, the casing being partly broken away. Fig. 2 is a cross section therethrough. Fig. 3 is a diagrammatic view with the casing removed and showing the hot and cold water inlets closed. Fig. 4 is a similar view showing the cold water on. Fig. 5 is a similar view showing both hot and cold water inlets open, and, Fig. 6 is a similar view showing the hot water on.

Referring to the figures, the casing 1 is provided with an enlarged socket portion 2 forming a bearing for the reduced end 3 of the operating spindle 4. The front plate 5, connected to the casing 1 by the screw cap 6, is provided with a centrally located nipple portion 7 through which said spindle is mounted and at the end of which I arrange a stuffing box 8. An operating handle 9 is mounted on the outer end of the spindle 4 by means of a washer 10 and a screw nut 11, and said handle is provided with a right angle arm 12 having an indicating member or pointer 13 arranged at the end thereof.

Through the casing 1 are arranged the hot water inlet 14, the cold water inlet 15 and the single universal outlet 16, each of which is provided with a constricted mouth 17 for a purpose hereinafter described.

On the operating spindle 4 is mounted a pair of spiders 18 rigidly held spaced apart by means of the transverse strips 19 and comprising angularly extending legs 20, 21, and 22 carrying roller valves 23, 24 and 25 respectively. The roller valves 24 and 25, are rotatively mounted on short shafts rigidly held between the corresponding legs of the spiders 18 and are adapted to regulate the cold water inlet on the movement of the handle 9 to close or open the same, as shown most clearly in Figs. 3 to 6. The leg 20 carrying roller valve 23 is, on the contrary, provided with a transverse slot 26, in which the rotating spindle 27 of said roller 23 is mounted to slide; the said roller being mounted through the arms 28 of an independent bracket having its sleeve 29 loosely mounted about the spindle 4. It will thus be seen that I am able to accomplish my object by the use of only three rollers forming valves adapted to be seated against the constricted mouth 17 of both hot and cold inlets, one of said valves having a delayed movement in order that the opposite inlet may be opened without moving the same from its seat as I will now describe.

Referring to Figs. 3 to 6, in which the different positions are shown with the effect indicated on the face of the front plate; and specifically to Fig. 3, the hot and cold inlets are shown closed by the roller valves 23 and 25, the valve 24 not being in use.

Referring to Fig. 4 it will be seen that when cold water is desired and handle 9 moved correspondingly, the roller valve 25 will be moved off of its seat and open the cold water inlet 15, but the movement of the roller valve 23 will be delayed and will remain seated, as shown, by reason of its slidable mounting in slot 26. As shown in this figure the roller is at the extremity of the slot when the cold water is on and when a mixture of cold and hot water is desired and handle 9 moved accordingly the valve 23 will be moved from its seat thus opening the hot water inlet, as shown in Fig. 5. Up to this time the valve 24 has remained in non-use but when hot water only is wanted the movement of the handle 9 is continued with the result that said valve 24 is seated on the mouth of the cold water inlet 15.

Having fully described my invention, what I claim is:

1. In a valve, the combination of a valve seat and a roller mounted to be seated thereon, and having a delayed movement with relation to its mounting, substantially as described.

2. In a valve, the combination of a valve seat and an independently revoluble roller adapted to be seated thereon, said roller being mounted to rotate about a central axis, and having a delayed movement with relation to its mounting, substantially as described.

3. In a valve of the class described, the combination with a casing having hot and cold water inlets and a universal outlet, of suitably mounted rollers adapted to be operated to open and close said inlets and said outlet, one of said rollers having a delayed movement with relation to the others, substantially as described.

4. In a valve of the class described, the combination with a casing having hot and cold water inlets and a universal outlet, of suitably mounted independently revoluble rollers arranged in spaced relation within said casing, and bearing against the wall thereof, said rollers being adapted to be operated to open and close said inlets and said outlet, one of said rollers having a delayed movement with relation to the others, substantially as described.

5. In a valve of the class described, the combination with a casing having hot and cold water inlets and a universal outlet, of a plurality of independently revoluble rollers mounted to rotate about a central axis and arranged to open and close said inlets during their rotative movement, one of said rollers having a delayed movement with relation to the others, substantially as described.

6. In a valve of the class described, the combination with a casing having hot and cold water inlets and a universal outlet, of a rotating frame mounted therein, a pair of independently revoluble rollers mounted in spaced relation in, and rotating with, said frame, a supplemental frame loosely mounted within said main frame and a roller revolubly mounted in said supplemental frame and having a limited sliding movement on the rotation of said main frame, substantially as described.

In testimony whereof I affix my signature in presence of two witnesses.

PHILIP W. MARETT.

Witnesses:
 ESTER M. MARETT,
 WILLIAM H. IRVING.